May 24, 1955    R. A. WALLACE    2,709,092
CONDUIT COUPLING CONSTRUCTION
Filed June 28, 1949

INVENTOR
Robert A. Wallace
BY Green, McCallister & Miller
His Attorneys

United States Patent Office 2,709,092
Patented May 24, 1955

2,709,092

CONDUIT COUPLING CONSTRUCTION

Robert A. Wallace, Venetia, Pa., assignor to
Walter O. Beyer

Application June 28, 1949, Serial No. 101,771

3 Claims. (Cl. 285—90)

This invention relates to the provision of coupling bodies and tube end sections for fluid couplings. One phase of my invention pertains to an improved construction for fluid couplings.

A coupling of my invention can effectively utilize relatively thin wall pipe members and/or members of a different material than the coupling, itself.

For purposes of illustration, my invention is shown as applied to a general type of fluid coupling such as disclosed by Beyer and Tarn in their U. S. Patent No. 2,259,453. This coupling consists of three essential parts, namely, a coupling body having a tapered or cone-shaped operating surface, a flexible grip annulus or element which is adapted to move along the tapered surface of the coupling body and to engage the outer circumference of a pipe member to be held, and a resilient gasket having a pressure heel that is, under an application of fluid pressure, adapted to force the grip element towards a converging end of the sloped surface of the coupling body and into locking engagement between the coupling body and the pipe member with a force that is proportional to the fluid pressure. The grip element has an inherent flexibility and a tendency to move backwardly along the tapered surface of the coupling body when fluid pressure is released.

Although my invention is not limited to such a type of coupling, it has particular importance as applied to a coupling whose operating-surface-carrying parts should have a stronger or more wear-resistant construction than the pipe members to be connected. I have been able to devise a relatively inexpensive, practical type of coupling provided with a pair of operating-surface-carrying parts that may be of any suitable strength characteristics, independently of the strength characteristics required for the pipe, tubing, or conduit members. In accordance with my construction, only immediately coupled or operating surface portions need to be strengthened or reinforced. This results in a great saving of material and weight and as a whole, facilitates assembly and disassembly of a quickly demountable or portable pipe line system. I also provide simple and effective procedure for making connections with pipe members, and if desired, for mounting a coupling tube end or a coupling body on pipe members in the field. The latter feature makes possible the utilization of more locally available pipe and at a considerable saving in transportation costs.

Where thin wall tubing is to be used, and its use is highly desirable from the original cost standpoint of a system, as well as from the standpoint of weight considerations, labor and equipment required in handling the system, an important problem is encountered in obtaining a suitable type of joint or connection between the coupling body and the pipe member upon which the coupling body is to be mounted. The same problem arises in providing a joint or connection between the other end of the pipe member and a tube end part that is to provide the other operating surface for the coupling. In an ordinary utilization of my invention, a female coupling body will be attached to one end of a pipe member and a reinforcing tube end part will be attached to the other end of the pipe member. In this way, a large number of suitable length pipe members may be demountably assembled in the field for irrigation purposes, for example, and after use, may then be disassembled, moved to another location, and quickly reassembled and used.

It has thus been an object of my invention to meet the problem presented in providing a coupling construction having relatively inexpensive and effective interfitting operating-surface-carrying parts that will have the necessary strength characteristics to withstand mistreatment, as well as maximum fluid pressures and mechanical stresses and strains to be encountered in a field utilization;

Another object has been to devise interfitting coupling parts that may be readily connected in a permanent manner to pipe members of an entirely different material, as well as of entirely different strength, surface characteristics and/or wall thicknesses;

A further object has been to provide a new and improved form of coupling and pipe member construction that is particularly suitable for utilization in pressure fluid applications;

A still further object has been to devise a highly effective, inexpensive, and simplified form of connection between hollow members, and particularly, between hollow members of different characteristics or of different wall thicknesses.

These and many other objects of my invention will appear to those skilled in the art from the illustrated embodiments thereof hereinafter set forth and explained.

In a sense, my present invention is based upon the determination that relatively thin wall pipe or tubular members could be employed in a flexibly coupled system for carrying a given maximum fluid pressure in which the pressure varies between zero and a maximum and may surge during the utilization of the pipe members. To carry out this determination, I have devised separate coupling operating-surface parts that are constructed to withstand the greater forces to which they are subjected and in such a manner that they can readily and suitably be connected to the pipe members. As distinguished from the coupling housing body part or portion, the strength characteristics of the pipe members may be selected on the basis of the pressure of the fluid to be carried. As an example, thin wall aluminum alloy tubing or pipe will be sufficient for carrying fluids under moderately high pressure conditions, but the aluminum alloy would not have the necessary physical characteristics for use in making the immediately coupled, or operating parts or portions of the coupling. It is desirable to construct the coupling housing connections or operating surface portions of ferrous metal and to provide them with a greater wall thickness than that of the pipe members. My invention eliminates the difficulties encountered in attempting to secure or weld unlike metals and materials, and the joining operation may be effected either in the manufacturing plant or in the field, as desired. That is, the operating portions of the coupling unit, that is, the coupling body, the tube end, and the coupling elements (gasket and coil), can be shipped to the distributor or ultimate user in the field, pipe or tubular members may be separately shipped from an entirely different source, and the body and tube end parts may be quickly and effectively mounted on end portions of the pipe members in a very simple manner in the field. This permits the user to select his own pipe and to obtain it from local sources. The joint produced in this manner is highly effective; no failures have been encountered in its utilization.

To more specifically designate the two operating-surface-carrying parts of the coupling unit which are of reinforced or strengthened construction, they have been termed the coupling, consisting of a coupling body and nose and a tube end which is the male end reinforcing section. The coupling body and nose constitute the female housing or shell part which is provided with the tapered operating surface or nose, while the tube end is the male shell portion which fits within the coupling body and is adapted to be secured over an end of the pipe member or tubing which is being coupled. The housing, on the other hand, may be adapted to be closed off for a dead end cap connection as a "coupling cap," or may be so constructed as to be secured to a pipe member or threaded pipe nipple.

In the drawings, Figure 1 is a side vertical section in elevation through a coupling unit constructed in accordance with my invention and illustrating a suitable relative position of the working parts thereof before fluid pressure has been applied;

Figure 1:
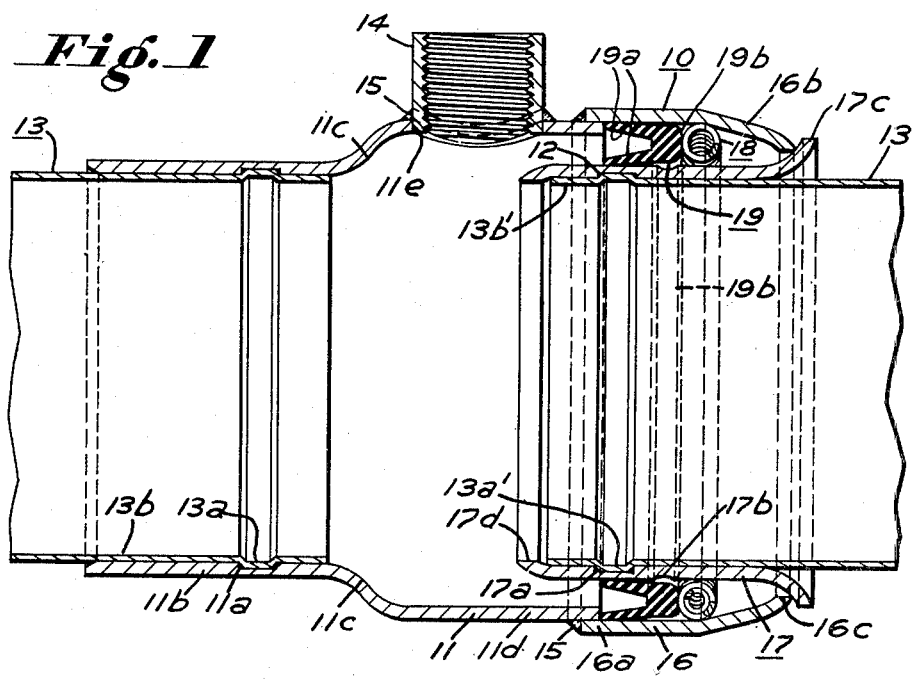
Figures 1A and 1B are enlarged side sectional detail views illustrating the connection joint construction of Figure 1 and how it is effected.
Figure 1A:
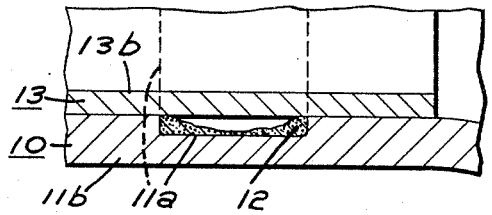
Figure 1B:
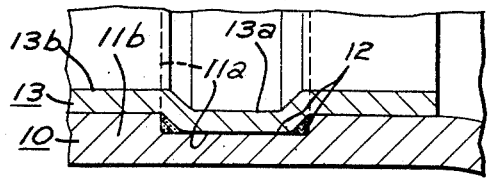

In accordance with a preferred procedure, I fabricate the coupling body 11 by first providing a suitable blank of the proper diameter and wall thickness. The blank may be cold drawn to shape it into a suitable size of cup. The bottom of the cup is then pierced, preferably in a spaced relation to the cylindrical portion of the cup to provide an inner flange, and the bottom of the cylinder thus produced is redrawn and the inner flange is forced out to form a continuation of the cylindrical end thereof. If a connecting member is to be mounted on the coupling body, I then pierce a side hole in the shaped body and weld one-half of a standard pipe coupling 14. The body 11 is finished by trimming the edge of its larger diameter 11d and then machining-in an annular joint, offset, connection, or fastening groove 11a of widened or substantially rectangular section in the inner periphery of its sleeve 11b. The tube end 17 may be also made from a suitable size blank which is draw-formed, pierced and also provided with a connection groove 17a within its inner periphery. The nose 16 that carries the tapered working surface portion 16b and the body 11 of the coupling housing are separately draw-formed from separate blanks and welded together, see Figures 1 and 2. The coupling housing or housing body, as a whole, as well as the tube end may be then secured upon an end of a pipe or tubular member 13 by first placing a suitable mastic filler 12 in the connection groove, inserting an end of the pipe within the sleeve 11b of the coupling body or in the tube end 17, as the case may be, and then rolling a groove or offset wall portion or peripheral band into the pipe end in exact alignment with the connection groove in the sleeve of the coupling body or the tube end, to bend out or force an annular or circular wall portion of the pipe end into the connection groove, and to provide a tightly-locked joint therebetween. This operation is accomplished in such a manner as to squeeze out some of the mastic from the connection groove, leaving mastic in the spacing between the corners of the connection groove and the rolled-in groove of curved section, and to provide an axially-spaced, double-line contact of the rolled-in groove with respect to the connection groove. The connection joint construction is such that any separating forces are resisted by the edges of contact and such that the rolled-in groove has a pair of opposite edges which tightly abut adjacent shear or corner edges of the connection groove of rectangular section.

Figure 2:
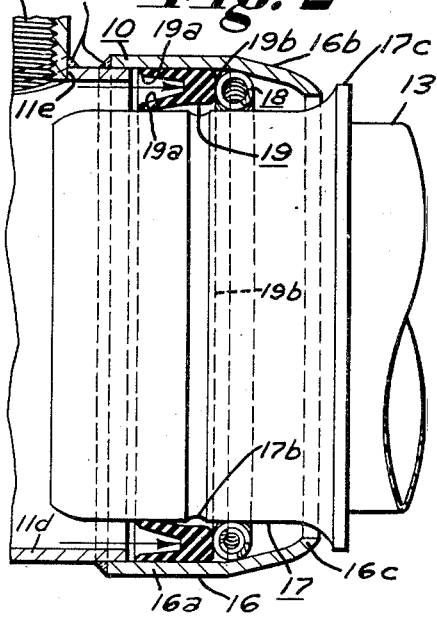
Figure 2 is a fragmental section similar to Figure 1 showing a suitable initial relationship of the working parts after fluid pressure has been applied.

In Figures 1 and 2, I have shown a coupling unit 10 constructed in accordance with my invention wherein the sleeve 11b of the housing and the tube end 17 thereof are securely connected to the ends of pipe or conduit members 13. The coupling housing part, as shown, is made up of a body portion 11 and a nose portion 16 that interfit and are secured together into a unitary housing construction by arc-weld metal 15. The body portion 11 has an enlarged, cylindrical front end 11d whose outer diameter substantially corresponds to the inner diameter of an enlarged cylindrical back end 16a of the nose or operating surface carrying portion 16. Thus the end portion 16a may be frictionally slid or telescoped over the end 11d.

The cylindrical back end or sleeve 11b of the body portion 11 of the coupling housing part is of smaller diameter and is integrally connected to the enlarged front end 11d by a shoulder 11c. A continuous annular groove or offset of rectangular section 11a is provided in the sleeve end 11b to receive a continuous rolled-in annular wall offset or grooved portion 13a of curved section of an end portion 13b of the pipe member 13. Mastic material, such as a caulking or rubber-like material 12 that is now available on the market, is positioned to fill up any spaces between the grooves 11a and 13a and to seal the connection. The end portion 13b of the pipe member 13 closely telescopes or frictionally fits within the cylindrical end 11b of the connection portion 11 of the coupling and with the interfitting grooves provides an effective, simple, and efficient joint connection therewithin.

If a vent connection such as a sprinkler is desired, the enlarged cylindrical front end 11d of the coupling body portion 11 is provided with an opening 11e to which a section of threaded pipe coupling 14 may be secured by weld metal 15, as shown.

The nose portion 16 of the coupling housing part is provided with a tapered or cone-shaped front or operating-surface-carrying end 16b which terminates in an inwardly-depending or flared safety edge or flange 16c. The other end 13b' of each pipe member 13 is shown provided with an operating-surface-carrying male or tube end part 17 which is adapted to be secured thereto. That is, it has a groove 17a corresponding to the groove 11a that is adapted to receive a rolled-in groove portion 13a' of the pipe member. The connection is, of course, sealed by mastic material 12. In this way, the other end of the pipe member 13 is provided with an operating-surface-carrying tube end part which cooperates with the cone-shaped or tapered operating surface-carrying portion 16b of the nose 16 of the coupling housing.

A U-shaped gasket 19 of a resilient or rubber-like material is adapted to be positioned in the spacing between the cylindrical end 16a of the nose 16 and the tube end part 17 with its open, pressure chamber facing backwardly of the coupling and being open to the fluid carried by the coupling. As shown, it has a pair of spaced-apart feather edges 19a that define the chamber therein and are adapted to rest upon adjacent surfaces of 16a and 17. An annular-shaped, flexible locking or grip element 18 of spring-like construction made up of flexible and spaced-apart convolutions is positioned between a heel portion 19b of the gasket 19 and the tapered surface 16b of the operating surface portion 16. In Figure 1, the elements 18 and 19 are in a normal position when fluid pressure is off for permitting an axial withdrawal of the intermediate or right hand pipe member 13 and its associated tube end part 17 with respect to the housing part of the coupling.

It will be noted that a pierced edge 17d of the tube end 17 is of slightly less diameter than the inner diameter adjacent to pipe 13 to serve as a guide stop for the inner edge of the pipe 13 when it is introduced therein, before the groove rolling-in operation which will be hereafter described. The edge 17d also serves as an additional strengthening support for the connection between the tube end 17 and the end portion 13b' of the pipe member 13. The bell end 17c of the tube end part 17 is turned-out or flanged and extends slightly beyond the corresponding turned-in edge 16c of the coupling nose 16 of the housing part. Thus, the ends 16c and 17c serve as limit stop means or portions for limiting the maximum inward movement of the pipe member 13 when it is introduced into the housing body part of the coupling.

It will also be noted that the tube end part 17, in addition to having an outward projecting flared or bell-shaped end 17c, is provided with an intermediate, slightly dished-in or grooved portion 17b along the outer periphery of its cylindrical body that is continuous thereabout and serves as a safety feature in the construction. That is, although it will normally have no function, since the operating elements 18 and 19 will positively hold the tube end part 17 within the housing part, an extremely high pressure, such as a surge, may be suddenly applied in the field, in which event, the tube end part 17 may move outwardly to the right of Figure 2. The grip element 18 would then engage within the safety groove 17b to provide a mechanical interlock and positively prevent further separation. The groove is preferably of slight depth, in order that the grip element 18 may be easily released when the pipe member 13 is to be removed from the coupling and, of course, after fluid pressure is off.

In Figure 2 I have shown the relative relationship of the operating parts when fluid pressure has been applied. It will be noted that the tube end 17 has moved slightly forwardly out of the coupling housing, that the pressure gasket 19 has moved forwardly and its heel 19b is facing or pressing the grip element 18 tightly against the converging or tapered operating surface of 16b, as well as against the adjacent cylindrical operating surface of the tube end 17. In this manner, the two operating-surface-carrying coupling parts are securely held in position when pressure is applied with a latching or holding action proportioned to the fluid pressure, and leakage is prevented by the two feather edges 19a.

I have determined that a single groove-joint connection between an end of the pipe member and a coupling part is sufficient to withstand all reasonable fluid pressure and other separating forces and that additional grooves are unnecessary. The mastic which is used is first placed in the machined groove 11a of the coupling sleeve 11b or the corresponding groove 17a of the coupling tube end 17, is squeezed out along the groove in the rolling-in operation, fills up any spaces between the machined groove of rectangular section and the rolled-in groove, and serves to bond closely abutting wall portions of the two grooves. On testing, I have determined that such a type of connection joint will withstand over 500 pounds per square inch pressure. This is in excess of published allowable working pressures for light wall aluminum alloy pipe. As pointed out, in forming a connection between a light wall pipe or tubing end portion and a reinforcing or tube end part 17, the same general type of rolling-in operation is accomplished. However, in this case, the cylindrical surface portion of the guide rollers make contact or engagement with the edge 17d thereof. The safety grove 17b may be formed during the same machining operation as the joint connection groove 17a.

Referring particularly to Figures 1 and 2, the grip coil 18 is preferably not spring loaded in the nose 16b. Also, it preferably has a slightly larger, normal inner diameter than the outer diameter of the tube end 17 upon which it is to be positioned. This makes it much easier to remove a pipe section 13 with the tube end 17 attached, after fluid pressure is off and does not in any way weaken the positive gripping or holding action when fluid pressure is applied. The outer diameter of the coil 18 is about the same diameter as the inner diameter of the cylindrical end 16a of the coupling nose 16.

What I claim is:

1. In a push-in assembly and a pull-out release fluid coupling of the character shown and described for positively holding an end portion of a fluid conduit in position therein under an application of fluid line pressure thereto and for releasing the end portion of the fluid conduit when fluid line pressure is relieved, wherein the coupling has a housing body provided with an internal operating surface therealong; wherein the internal operating surface is defined by a backwardly-positioned annular portion, by a radially-inwardly offset abutment connected to a back end of the annular portion, and by a forwardly-positioned cone-shaped throat portion connected at its back end to a forward end of the annular portion and converging forwardly therefrom into a radially-inwardly-projecting forward annular flange; wherein a flexible grip annulus is carried by the housing body for operative movement on and along the throat portion, and wherein a fluid-sensitive annular gasket defines a fluid-pressure-sensitive chamber open backwardly towards the abutment and is operatively carried on the annular portion between the abutment and the grip annulus for forward movement from and backward movement towards the abutment, and which has a resilient pressure heel that is positioned in operative adjacency with the grip annulus and is movable in response to an application of fluid line pressure to advance the grip annulus into gripping engagement forwardly along the throat portion; the combination of a reinforcing tubular nose secured over the end portion of the conduit and having an external surface to be positioned longitudinally within the housing body and in an operating space-defining relationship with the internal operating surface of the housing body; said external surface having an annular operating surface portion therealong terminating at an inner end of the conduit in a housing entry portion, and having an outwardly-diverging bell-shaped stop portion extending outwardly from said annular operating surface portion and radially-outwardly beyond the forward annular flange of the housing body to positively retain the flexible grip annulus within the operating space when the nose is in position within the housing body; a longitudinally-intermediately positioned and radially-inwardly depressed annular safety groove portion about said annular operating surface portion; the flexible grip annulus in its initial relationship with respect to said annular operating surface portion, before the application of fluid line pressure and after such pressure has been relieved, having an internal diameter that is greater than the external diameter of said annular operating surface portion and, upon the application of fluid line pressure, operating in gripping engagement between the throat portion and said annular operating portion forwardly-outwardly of said safety groove portion; said safety groove portion being of relatively smooth and equal curvature along its annular extent and substantially corresponding to the curvature of the grip annulus to receive the latter and mechanically interlock therewith, for positively limiting a maximum outward movement of said nose with respect to the housing body during the application of fluid line pressure and irrespective of variations in and of the extent of the fluid line pressure.

2. A fluid coupling as defined in claim 1 wherein a connection joint secures said reinforcing tubular nose over the end portion of the conduit, said connection joint is defined by an annular grooved portion of rectangular section on the underside of said tubular nose that is open to an outer peripheral surface of the conduit, and by an annular wall band offset for the full thickness of the wall of the conduit into a side shear-line latching engagement within said grooved portion.

3. In a push-in assembly and a pull-out release fluid coupling of the character shown and described for positively holding an end portion of a fluid conduit in position therein under an application of fluid line pressure thereto and for releasing the end portion when fluid line pressure is relieved, wherein the coupling has a housing body provided with an internal operating surface therealong; wherein the internal operating surface is defined by a backwardly-positioned annular portion, by a radially-inwardly offset abutment connected to a back end of the annular portion, and by a forwardly-positioned cone-shaped throat portion connected at its back end to a forward end of the annular portion and converging-forwardly therefrom into a radially-inwardly-projecting forward annular flange; wherein a flexible grip annulus is carried by the housing body for operative movement on and along the throat portion; and wherein a fluid sensitive annular gasket defines a fluid-pressure-sensitive chamber open backwardly towards the abutment and is operatively carried on the annular portion between the abutment and the grip annulus for forward movement from and backward movement towards the abutment, and which gasket has a resilient pressure heel that is positioned in operative adjacency with the grip annulus and is movable in response to an application of fluid line pressure to advance the grip annulus into gripping engagement forwardly along the throat portion; the combination of a reinforcing tubular nose secured over the end portion of the conduit and having an external operating surface to be positioned longitudinally within the housing body and in an operating space-defining relationship with the internal operating surface of the housing body; said external surface having a cylindrical operating portion extending therealong and terminating at its inner end in a radially-inwardly-turned end portion to provide a guide stop for an inner edge of the end portion of the conduit and facilitate an entry of said nose into the housing body, said cylindrical operating portion terminating at its outer end in a forwardly-diverging bell-shaped outer portion that projects radially-outwardly beyond the forward annular flange of the housing body to positively retain the grip annulus within the operating space and to control the push-in positioning of said nose within the housing body, a longitudinally-intermediately positioned and radially-inwardly depressed annular safety groove portion about said cylindrical operating portion; the flexible grip annulus in its initial relationship with respect to said cylindrical operating portion, before the application of fluid line pressure and after such pressure has been relieved, having an internal diameter that is greater than the external diameter of said cylindrical operating portion and, upon the application of fluid line pressure, operating in gripping engagement between the throat portion and said cylindrical operating portion forwardly-outwardly of said safety groove portion; said safety groove portion being relatively shallow and having a relatively smooth and equal curvature along its annular extent substantially corresponding to the curvature of the grip annulus to receive the latter and mechanically interlock therewith for positively limiting a maximum outward movement of said nose with respect to the housing body during the application of fluid line pressure and irrespective of variations in and of the extent of the fluid line pressure.

References Cited in the file of this patent

UNITED STATES PATENTS

| Number | Name | Date |
|---|---|---|
| 310,264 | Emery | Jan. 6, 1885 |
| 332,035 | Bagaley | Dec. 8, 1885 |
| 455,502 | Bayles | July 7, 1891 |
| 1,515,750 | Pasman | Nov. 18, 1924 |
| 1,754,639 | Meyer | Apr. 15, 1930 |
| 1,805,102 | Murphy | May 12, 1931 |
| 1,877,093 | Wakefield | Sept. 13, 1932 |
| 1,879,364 | Lomar | Sept. 27, 1932 |
| 1,911,775 | Smith | May 30, 1933 |
| 1,938,194 | Rader | Dec. 5, 1933 |
| 1,953,665 | Wallace | Apr. 3, 1934 |
| 1,999,791 | Siegfried | Apr. 30, 1935 |
| 2,089,790 | Halpern | Aug. 10, 1937 |
| 2,111,956 | Baldwin | Mar. 22, 1938 |
| 2,134,311 | Minor et al. | Oct. 25, 1938 |
| 2,160,263 | Fletcher | May 30, 1939 |
| 2,259,453 | Beyer et al. | Oct. 21, 1941 |
| 2,269,560 | Stout | Jan. 13, 1942 |
| 2,358,408 | McMurray | Sept. 19, 1944 |
| 2,398,399 | Alexander | Apr. 16, 1946 |
| 2,421,667 | Veit et al. | June 3, 1947 |
| 2,429,202 | Estill | Oct. 21, 1947 |
| 2,434,426 | Muller | Jan. 13, 1948 |
| 2,451,252 | Stoeckley | Oct. 12, 1948 |
| 2,508,716 | Hauf | May 23, 1950 |
| 2,517,778 | Fischer | Aug. 8, 1950 |
| 2,587,810 | Beyer | Mar. 4, 1952 |

FOREIGN PATENTS

| Number | Country | Date |
|---|---|---|
| 37,202 | Switzerland | Apr. 3, 1906 |